United States Patent
Groom et al.

(10) Patent No.: US 8,030,907 B2
(45) Date of Patent: Oct. 4, 2011

(54) ACCELERATED RESPONSE TO LOAD TRANSIENTS IN PFM DC-TO-DC CONVERTERS

(75) Inventors: Terry J Groom, Lucas, TX (US); Jason Leonard, Moncure, NC (US)

(73) Assignee: Linear Technology Corporation, Milpitas, CA (US)

( * ) Notice: Subject to any disclaimer, the term of this patent is extended or adjusted under 35 U.S.C. 154(b) by 506 days.

(21) Appl. No.: 12/275,129

(22) Filed: Nov. 20, 2008

(65) Prior Publication Data

US 2010/0123444 A1     May 20, 2010

(51) Int. Cl.
    *G05F 1/10*          (2006.01)
    *G05F 1/40*          (2006.01)
(52) U.S. Cl. .................... 323/222; 323/285; 323/290
(58) Field of Classification Search .............. 323/222, 323/282, 284, 285, 290
See application file for complete search history.

(56) References Cited

U.S. PATENT DOCUMENTS

| | | | | |
|---|---|---|---|---|
| 5,770,940 A * | 6/1998 | Goder | | 323/282 |
| 6,163,143 A * | 12/2000 | Shimamori | | 323/284 |
| 7,019,504 B2 * | 3/2006 | Pullen et al. | | 323/283 |
| 7,812,585 B2 * | 10/2010 | Zhou et al. | | 323/284 |
| 2005/0017703 A1 * | 1/2005 | Walters et al. | | 323/288 |

* cited by examiner

*Primary Examiner* — Jessica Han
(74) *Attorney, Agent, or Firm* — McDermott Will & Emery LLP

(57) ABSTRACT

A pulse generator circuit in a DC-to-DC converter may be configured to generate pulses that have a frequency that increases in response to increases in the load on the DC-to-DC converter. The pulse generator circuit may be configured to cause each pulse to have a constant width. When the pulse reaches the end of the constant width and the magnitude of the current through an inductance in the converter is less than a threshold value, however, the pulse generator may be configured to extend the pulse until the magnitude of the current through the inductance reaches the threshold value. The pulse generator circuit may be configured to prematurely terminate each pulse if and at such time as the load voltage exceeds a target value by approximately half of the peak-to-peak voltage of the ripple component plus the noise component margin.

23 Claims, 4 Drawing Sheets

FIG. 1(a) *(Prior Art)*

| TRANSIENT RESPONSE COMPARISONS | | |
| --- | --- | --- |
| PARAMETER | LOW DUTY FACTOR | HIGH DUTY FACTOR |
| $V_{LOAD}$ | 1.2V | 3.3 V |
| $V_{SOURCE}$ | 38 | 4 V |
| $T_{OFF(min)}$ | 120nS | SAME |
| $C_{OUT}$ | 760uF | SAME |
| $I_L$ | 10A | SAME |
| L | 400uH | SAME |
| FREQUENCY | 300kHz | SAME |
| PRIOR ART LOAD STEP $V_{ERR}$ | 106mV | 14.1mV |
| FIG. 2-3 LOAD STEP $V_{ERR}$ | 51mV | 13.6mV |
| LOAD STEP % IMPROVEMENT | 52 % | 4 % |
| PRIOR ART LOAD RELEASE $V_{ERR}$ | 48mV | 47mV |
| FIG. 2-3 LOAD RELEASE $V_{ERR}$ | 48mV | 12mV |
| LOAD RELEASE % IMPROVEMENT | 0 % | 74 % |

FIG. 4

ACCELERATED RESPONSE TO LOAD TRANSIENTS IN PFM DC-TO-DC CONVERTERS

BACKGROUND

1. Technical Field

This disclosure relates to power converters and, more particularly, to DC-to-DC converters that use pulse frequency modulation ("PFM").

2. Description of Related Art

Power converters typically convert power from one level to another, while conserving power in the transformation. For example, a supply voltage may be converted from one voltage to another or to a current.

One type of power converter is a DC-to-DC converter. These are often referred to as point of load converters where the input voltage is converted to a desired output voltage from an input source at the point of load. Such a converter may convert a direct current ("DC") voltage at one level to a DC voltage at a different level, such as to a lower level. To accomplish this, an electronic switch and an inductor may be connected in series between a DC source voltage supply and a load (which may include filtering capacitance). The electronic switch may be configured to control the supply of current through the inductor in response to a control signal that is delivered to the electronic switch. The control signal may be a series of pulses. The electronic switch may conduct current from the source voltage supply to the inductor at such times as the pulses are high. By regulating the pulses, the energy which is delivered into the inductor may be regulated and, in turn, the voltage that is delivered to the load.

A pulse controller circuit may be used to generate the pulses that are delivered to the electronic switch. The pulse controller circuit may be configured to generate pulses having a fixed pulse width, commonly referred to as a constant on time. The amount of energy that is delivered into the inductor may thus be regulated by controlling the frequency of these constant-width pulses. Typically, a feedback loop is provided which causes the frequency of the pulses to increase in response to increases in the load on the DC-to-DC converter.

Changes in the load on the converter may require corresponding changes in the amount of energy which is delivered into the inductor in order to maintain the output load voltage constant. In turn, this may require changes in the frequency of the pulses that are delivered to the electronic switch.

Unfortunately, conditions can arise when constant on-time, pulse controller circuits fail to respond quickly enough to changes in the load on the converter, thus causing the output voltage to deviate from a target value for an undesirably long period. For example, a rapid increase in the load on the converter, commonly referred to as a "load step," may cause a corresponding rapid decrease in the output voltage. In response, the pulse controller circuit may increase the frequency of the pulses to increase the energy that is delivered to the load so as to bring the voltage back to the target value. However, the maximum pulse frequency which can be produced by these pulse controller circuits may be limited by a minimum off time ($T_{OFF(min)}$) between each pulse. This may limit the ability of these pulse controller circuits to quickly bring the load voltage back to the target value in response to the load step.

A similar delay may result in connection with a rapid decrease in the load on the converter, commonly referred to as a "load release." A load release may cause an undesirable jump in the load voltage. When a load release occurs immediately after the pulse controller circuit initiates a constant on-time pulse, energy may continue to be delivered into the inductor, even though the load has been decreased. This continued delivery of energy into the inductor may cause the load voltage to increase even further, when exactly the opposite may be needed. This may again reduce the ability of the pulse controller circuit to rapidly bring the load voltage back to the target value in response to a transient condition.

In short, constant width PFM DC-to-DC-converters may fail to recover in response to transients caused by load steps and/or load releases as quickly as may be desired.

SUMMARY

A pulse controller circuit may be used in a DC-to-DC converter. The pulse controller circuit may have a load voltage input configured to receive a signal that is representative of the voltage which the DC-to-DC converter applies to a load. The pulse controller circuit may have an inductance current input configured to receive a signal that is representative of the current through an inductance through which current flows from a source voltage supply to the load through an electronic switching system. The pulse controller circuit may have a pulse generator circuit configured to generate pulses that have a frequency that increases in response to increases in the load on the DC-to-DC converter.

The pulse generator circuit may be configured to cause each pulse to have a constant width. When the pulse reaches the end of the constant width and the magnitude of the current through the inductance is less than a threshold value, however, the pulse generator may be configured to extend the pulse until the magnitude of the current through the inductance reaches the threshold value.

The voltage which the DC-to-DC converter applies to a load may have a ripple component having a peak-to-peak value and a noise and/or component. The pulse generator circuit may be configured to prematurely terminate each pulse if and at such time as the load voltage exceeds a target value by approximately half of the peak-to-peak voltage of the ripple component plus a noise component margin.

The pulse controller circuit may have a pulse output configured to deliver the pulses generated by the pulse generator circuit to the electronic switching system.

A DC-to-DC converter may include an electronic switching system, an inductance through which current flows from a source voltage supply to a load through the electronic switching system, and a pulse controller circuit of one of the types described above.

These, as well as other components, steps, features, objects, benefits, and advantages, will now become clear from a review of the following detailed description of illustrative embodiments, the accompanying drawings, and the claims.

BRIEF DESCRIPTION OF DRAWINGS a) The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it is intended to refer to the same or like components or steps.

FIG. 1(a) is a pulse diagram of various signals in a prior art constant on time PFM DC-to-DC converter during both a load step and a load release.

FIG. 4 is a table comparing operating parameters of a prior art constant on time PFM DC-to-DC converter of the type that generates the signals illustrated in FIG. 1(a) to operating parameters of a PFM DC-to-DC converter of the type that that generates the signals illustrated in FIG. 1(b).

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

FIG. 1(a) is a pulse diagram of various signals in a prior art constant on time PFM DC-to-DC converter during both a load step and a load release. The converter may of the type described above under the Description of Related Art.

Figure 1B:
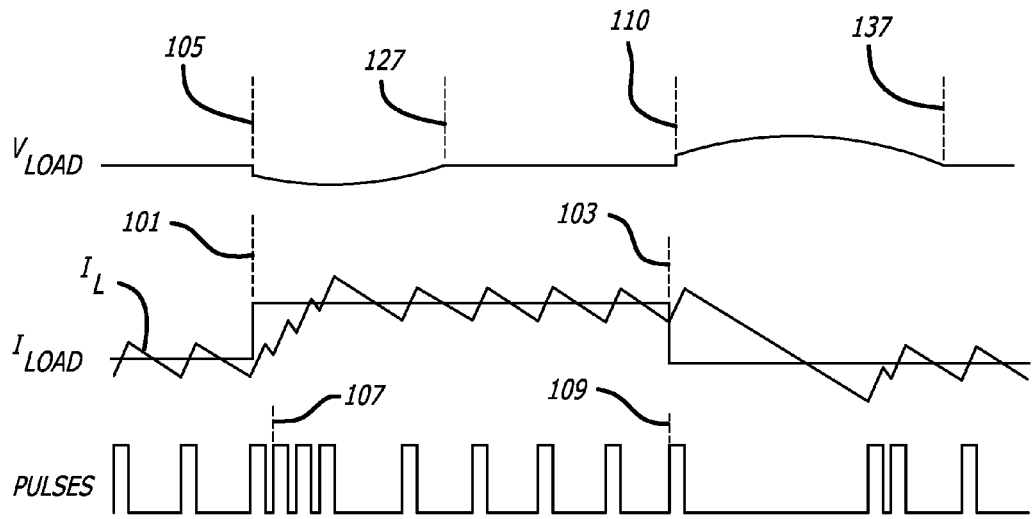
FIG. 1(b) is a pulse diagram of various signals in the PFM DC-to-DC converter illustrated in FIG. 3 during both a load step and a load release.
Figure 1B:
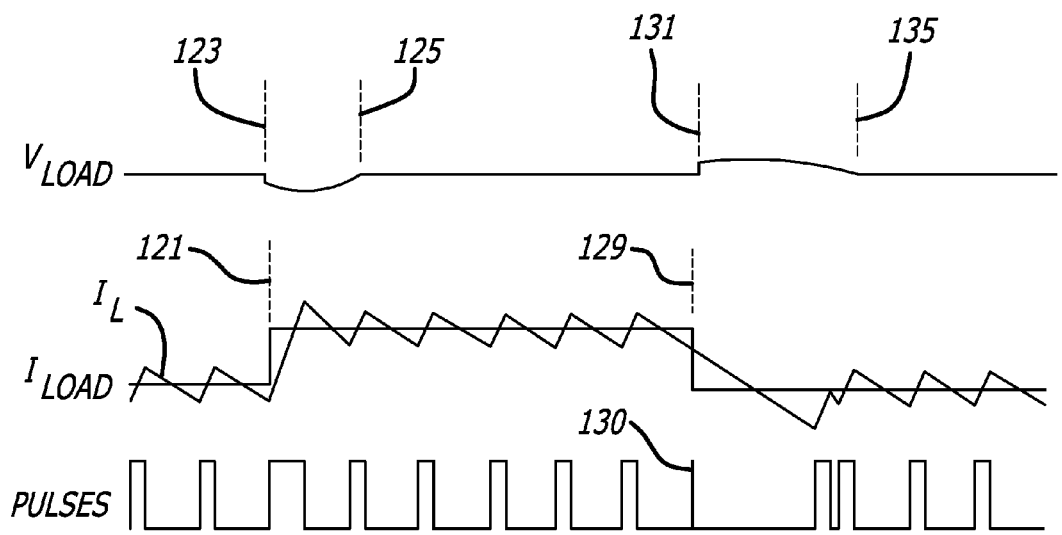

As illustrated in FIG. 1, a load current $I_{LOAD}$ may rapidly increase at a load step 101 and may later rapidly decrease at a load release 103.

The load current $I_{LOAD}$ may hold fairly steady before the load step 101. In order to maintain the load voltage $V_{LOAD}$ substantially constant at a target value while the load current $I_{LOAD}$ is constant, a series of constant-width-pulses at a constant frequency may be delivered to the electronic switch that is part of the PFM DC-to-DC converter, as illustrated by the first three pulses at the bottom of FIG. 1. As illustrated in FIG. 1, the inductor current $I_L$ may average to approximately the load current $I_{LOAD}$.

The increased load represented by the load step 101 may cause an immediate decrease 105 in the load voltage $V_{LOAD}$, as illustrated in FIG. 1. Upon sensing these conditions, the pulse controller circuit may substantially increase the frequency of the pulses, as illustrated by an increase in the frequency of the pulses beginning at a time 107. As a practical matter, however, the pulse controller circuit may have an inherent minimum off-time ($T_{OFF(min)}$) between pulses. This may restrict the rate at which the electronic switch may deliver energy into the inductor and, in turn, may delay the time 127 when the load voltage $V_{LOAD}$ may return to the target value, as reflected in FIG. 1.

The load release 103 may occur shortly following the initiation of a pulse, such as shortly following the initiation of a pulse 109. This may cause an increase 110 in the load voltage $V_{LOAD}$ which may need to be corrected. What may be needed is for the circuit to cease delivering energy into the inductor. But what may happen is that energy may continue to be delivered into the inductor because of the fixed width of the pulse 109, further increasing the voltage error which results from the load release, as illustrated in FIG. 1. The ultimate effect of delivering additional energy into the inductor at a time when energy needs to be removed may be, again, to prolong the point in time 137 when the load voltage $V_{LOAD}$ returns to its target value, as illustrated in FIG. 1.

In short, limitations inherent in prior art constant on time PFM DC-to-DC converters may limit their ability to quickly correct for transient load conditions.

Figure 2:
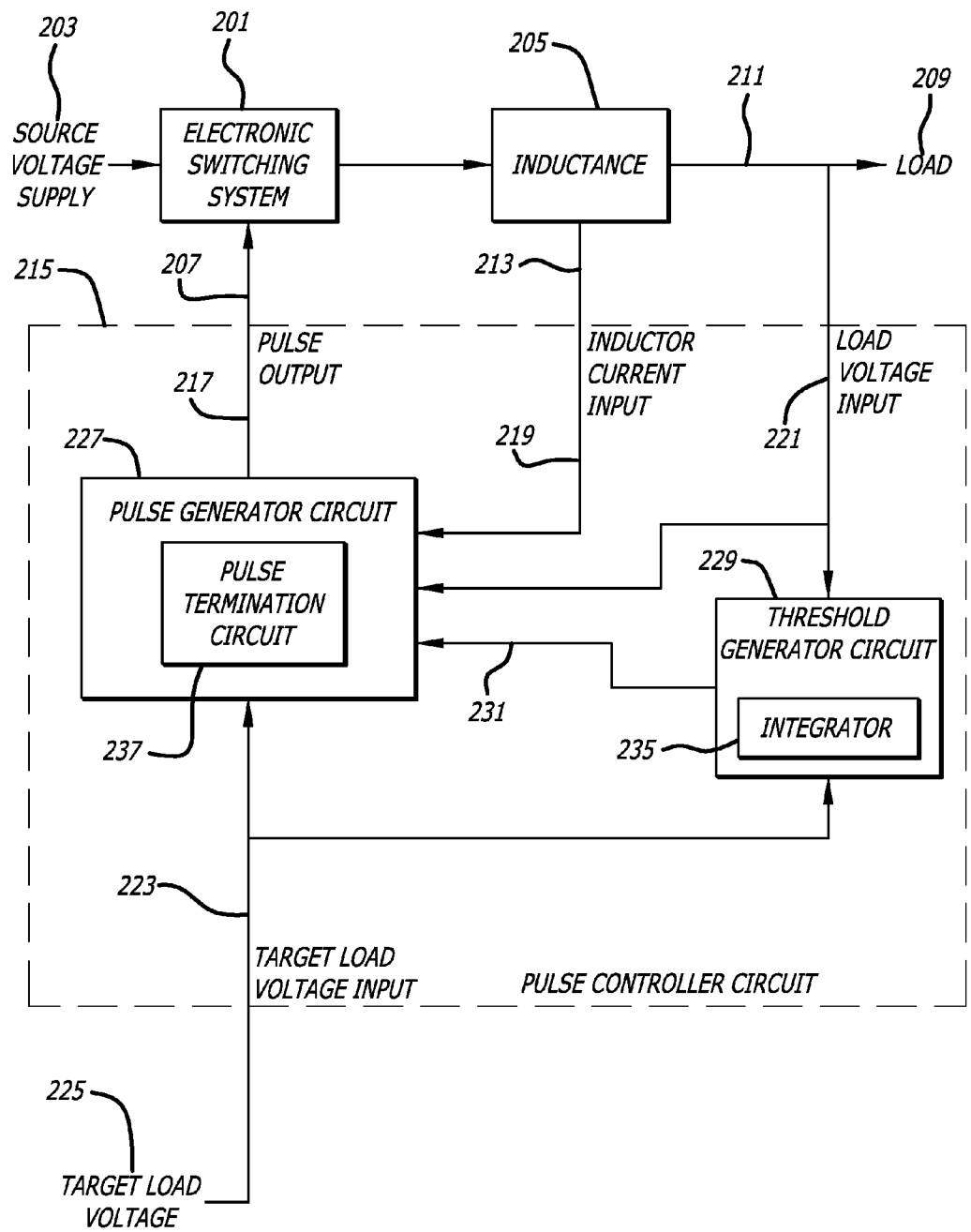
FIG. 2 is a block diagram of a PFM DC-to-DC converter that includes a pulse controller circuit that provides accelerated responses to load steps and load releases.

FIG. 2 is a block diagram of a PFM DC-to-DC converter that includes a pulse controller circuit that provides enhanced transient responses to load steps and load releases. As illustrated in FIG. 2, the DC-to-DC converter may include an electronic switching system 201 that controllably meters the delivery of a source voltage supply 203 to an inductance 205 based on a control signal at a control input 207.

The inductance 205 may, in turn, deliver current to a load 209, causing a load voltage 211 to develop across the load. The load 209 may include filtering capacitance, in addition to devices being driven by the DC-to-DC converter.

The source voltage supply 203 may be of any type. For example, it may be a DC voltage that is higher than a DC voltage which is desired to be delivered to the load 209, i.e., a target load voltage.

Associated with the inductance 205 may be one or more types of devices which may produce a current signal 213 which is representative of the current flowing through the inductance 205.

A pulse controller circuit 215 may be configured to generate one or more pulses at a pulse output 217 that may be delivered to the control input 207 of the electronic switching system 201 so as to control the state of the electronic switching system 201. The pulse controller circuit 215 may have as inputs an inductor current input 219, a load voltage input 221, and a target load voltage input 223.

The inductor current input 219 may be configured to receive a signal that is representative of the current through the inductance 205. Similarly, the load voltage input 221 may be configured to receive a signal that is representative of the voltage on the load 209. Similarly, the target load voltage input 223 may be configured to receive a signal that is representative of a desired target voltage 225 on the load 209. The pulse controller circuit 215 may have additional inputs and/or outputs.

All of the inputs to and outputs from the pulse controller circuit 215 may be of any type. For example, they may be connection pads and/or leads on an integrated circuit. The inputs to and outputs from the pulse controller circuit 215 may in addition or instead simply be circuitry locations that are hard wired to other circuitry components.

The pulse controller circuit 215 may be packaged separately from other circuitry components or together with them. The packaging may consist of an integrated circuit, a circuit board with discreet components, any other type of packaging, or any combination of these.

The pulse controller circuit may include a pulse generator circuit 227. The pulse generator circuit may be configured to generate pulses that have a frequency that increases in response to increases in the load on the DC-to-DC converter. The pulse generator circuit 227 may be configured to cause each pulse to have a constant width. DC-to-DC converters with pulse generator circuits of this type are commonly referred to as being pulse frequency modulated ("PFM").

The pulse generator circuit 227 may be configured to extend a pulse beyond the constant width if, when the pulse reaches the end of the constant width, the magnitude of the current through the inductance 205 is less than a threshold value. In such cases, the pulse generator circuit 227 may be configured to extend the width of the pulse until such time as the magnitude of the current through the inductance reaches the threshold value.

A threshold generator circuit 229 may be configured to generate a threshold signal 231 that is representative of the threshold value. The threshold value may be based on any criteria. For example, the threshold generator circuit 229 may be configured to generate the threshold signal 231 based on the load 209 on the DC-to-DC converter.

The threshold generator circuit may include an integrator 235. Using the integrator 235, the threshold generator circuit 229 may be configured to generate the threshold signal 231 by integrating the difference between a signal that is representative of the load voltage 211 which the DC-to-DC converter applies to the load 209 and a target load voltage 225 that is representative of a target load voltage on the load 209.

The load voltage 211 which the DC-to-DC converter delivers to the load 209 may include a ripple component having a peak-to-peak voltage and a noise component. The pulse generator circuit 227 may be configured to prematurely terminate any pulse which it generates at such time as the load voltage 211 exceeds a target load voltage by approximately half of the peak-to-peak voltage of the rippled component plus a margin for the noise component (which, in some configurations, may be zero). For this purpose, the pulse generator circuit 227 may include a pulse termination circuit 237. The pulse termination circuit may be configured to generate a pulse termination signal when the load voltage 211 exceeds the target load voltage by approximately half of the peak-to-peak voltage of the ripple component plus the noise component margin.

Figure 3:
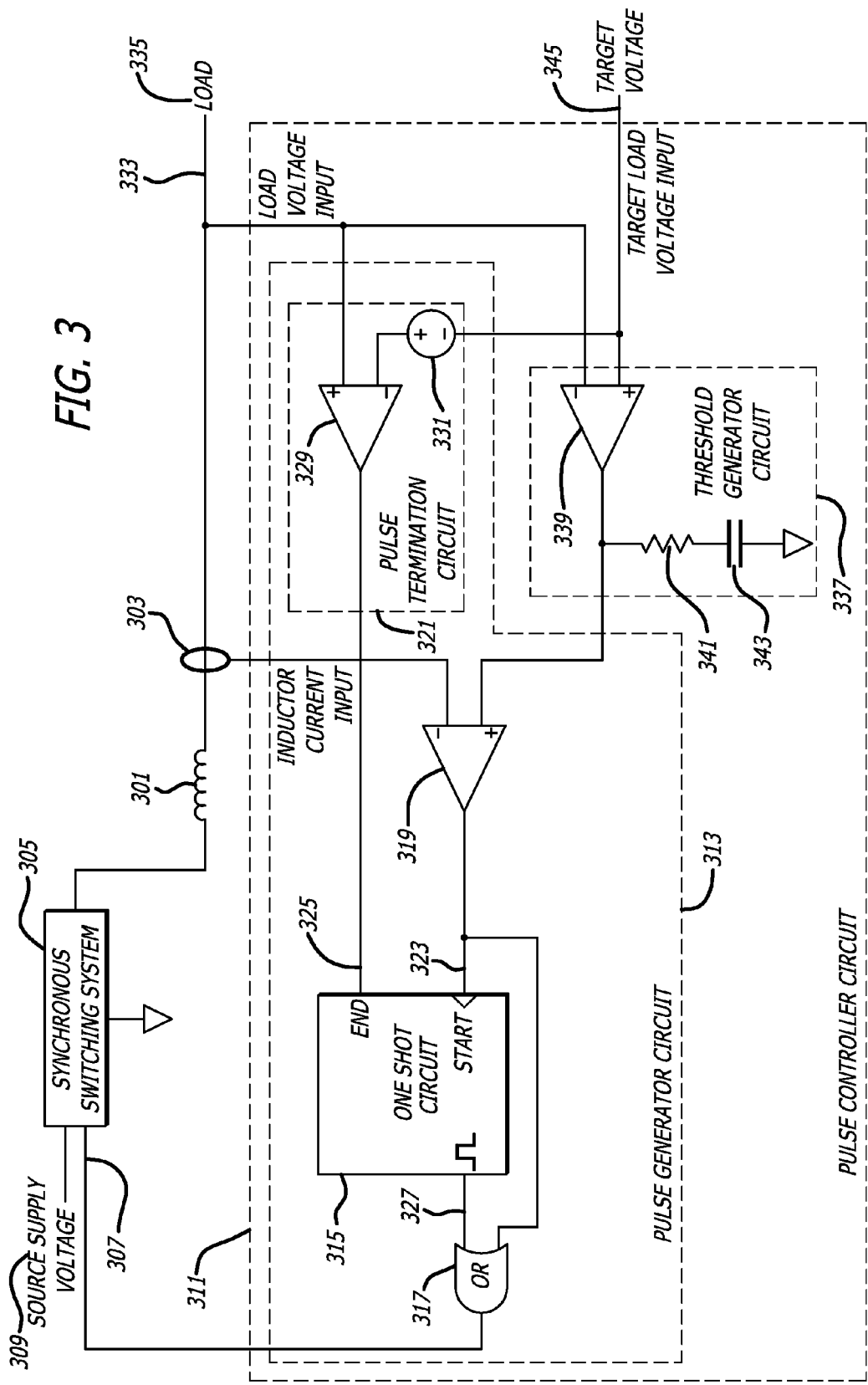
FIG. 3 is one implementation of the PFM DC-to-DC converter illustrated in FIG. 2.

FIG. 3 is an example of one implementation of the PFM DC-to-DC converter illustrated in FIG. 2. The PFM DC-to-DC converter illustrated in FIG. 2 may instead be implemented by several other types of circuits.

As illustrated in FIG. 3, the inductance 205 in FIG. 2 may be implemented with an inductor 301. Other circuits may use multiple inductors and/or other components. The current that travels through the inductor 301 may be sensed by a current sensing device 303, such as by a sense resistor, a DCR, and/or any other type of current sensing device or circuit.

The electronic switching system 201 may be implemented with a synchronous switching system 305. The synchronous switching system 305 may include a pair of electronic switches, such as a pair of FETs. One switch may be configured to connect the inductor 301 to a source supply voltage 309. The other switch may be configured to connect the inductor 301 to ground. These pair of switches may be synchronously operated such that one is always turned on when the other is turned off and vice versa. A control signal 307 may be received by the synchronous switching system 305 and used to control the state of the synchronous switches. When the control signal 307 is high, for example, the synchronous switching system 305 may be configured to cause the inductor 301 to be connected to the source supply voltage 309. When the control signal 307 is low, on the other hand, the synchronous switching system 305 may be configured to connect the inductor 301 to ground.

Other types of circuits may be used for the electronic switching system 201 in addition or instead. For example, a single electronic switch may be used. When synchronous switching is used, moreover, the inductor 301 may be connected to a negative voltage when the control signal 307 is low, rather than to ground.

The pulse controller circuit 215 in FIG. 2 may be implemented by a pulse controller circuit 311. Similarly, the pulse generator circuit 227 in FIG. 2 may be implemented by a pulse generator circuit 313. The pulse generator circuit 313 may include a one shot circuit 315, a logic circuit, such as an OR gate 317, a comparator 319, and a pulse termination circuit 321 which may correspond to the pulse termination circuit 237 in FIG. 2.

The one shot circuit 315 may include a start input 323, an end input 325, and a one shot output 327. The one shot circuit 315 may be configured to generate a single pulse of fixed width at the one shot output 327 following each rising edge at the start input 323. The one shot circuit 315 may be configured to block generation of this one shot pulse if the signal at the end input 325 is high prior to the rising edge of the signal at the start input 327. The one shot circuit 315 may be configured to truncate the one shot pulse before it reaches its fixed width if and at the moment that the signal at the end input 325 goes high at any point during the delivery of the one shot pulse at the one shot output 327. The pulse termination circuit 321 may include a comparator 329 and an offset circuit, such as a voltage source 331.

The DC-to-DC converter that is illustrated in FIG. 3 may be configured to deliver a load voltage 333 to a load 335. The load voltage 333 may have a ripple component which has a peak-to-peak voltage and a noise component. The offset circuit, such as the voltage source 331, may be configured to add approximately one half of this peak-to-peak voltage plus a margin for this noise component (which may be zero in some configurations) to a signal representative of a target load voltage 345 before it reaches the comparator 329. This would require the load voltage 333 to exceed the target load voltage by approximately one half of the peak-to-peak voltage of the ripple component plus the noise component margin before the comparator 329 changes state. This may signal the one shot circuit 315 to prevent the issuance of a pulse or prematurely terminate one that has already been issued. These signals may be scaled as desired or needed.

The threshold generator circuit 229 in FIG. 2 may be implemented by a threshold generator circuit 337. The threshold generator circuit 337 may include a comparator 339, a resistor 341 and a capacitor 343. The resistor 341 and the capacitor 343 may function to integrate the error signal generated by the comparator 339 as a result of a comparison between a signal representative of the load voltage 333 and a signal representative of a target load voltage 345.

FIG. 1(*b*) is a pulse diagram of various signals in the PFM DC-to-DC converter illustrated in FIG. 3 during both a load step and a load release. The way in which the converter illustrated in FIG. 3 operates will now be described in conjunction with a description of this pulse diagram.

When the load 335 is constant, the load current $I_{LOAD}$ may also be constant, as reflected by the initial steady state of the load current $I_{LOAD}$ in FIG. 1(*b*). In order to have reached this steady state, the threshold generator circuit 337 may have developed an output threshold signal which is representative of the amount of inductor current $I_L$ which must be delivered to the inductor 301 to maintain the load current $I_{LOAD}$ constant at the desired target load voltage.

During this steady state condition, the inductor current $I_L$ through the inductor 301 may occasionally dip below the threshold value. When this happens, the output of the comparator 319 may go high, which may cause the one shot circuit 315 to generate a new one shot pulse at the one shot output 327. In turn, this pulse may be applied to the control signal 307 of the synchronous switching system 305, as reflected by the first pulse that appears in FIG. 1(*b*). After this constant width pulse terminates, the additional energy that was delivered into the inductor 301 transfers to the output load 335, again causing the inductor current $I_L$ through the inductor 301 to dip below the threshold value, again causing a replenishing pulse. This steady state condition may continue for so long as the load current $I_{LOAD}$ remains constant, which may result in a series of pulses at a substantially fixed frequency, each of which may have substantially the same constant width.

During this period of time when the load current $I_{LOAD}$ is constant, the operation of the prior art circuit whose signals are illustrated in FIG. 1(a) may be substantially the same as the operation of the circuit which is illustrated in FIG. 3, as reflected by the similarities between the signals illustrated in FIGS. 1(a) and 1(b) during this period.

At some point in time, there may be a load step 121, as illustrated in FIG. 1(b). For the sake of comparison, the load step 121 is illustrated as occurring at the same time and in the same amount as the load step 101 in FIG. 1(a). The timing and/or magnitude of the load step 121 may instead be different.

The load step 121 may initially cause a decrease in the load voltage $V_{LOAD}$, as illustrated by a load voltage step 123. In turn, this may cause the threshold signal that is generated by the threshold generator circuit 337 to increase, causing the output of the comparator 319 to rise, ultimately causing a new pulse to be initiated by the one shot circuit 315. By the time the one shot pulse generated by the one shot circuit 315 is complete, however, the inductor current $I_L$ may not yet have reached the threshold generated by the threshold generator circuit 337. As a consequence, the output of the comparator 319 may remain high. The control signal 307 to the synchronous switching system 305 may be controlled by a logical ORing of the one shot output 327 and the output of the comparator 319 by the OR gate 317. The control signal 307 to the synchronous switching system 305 may therefore remain high after the one shot pulse from the one shot circuit 315 ends until such time as the inductor current $I_L$ equals the threshold that is generated by the threshold generator circuit 337. This is reflected in FIG. 1(b) by an extension of the width of the third pulse. As compared to FIG. 1(a), the pulse stream that is generated by the pulse controller circuit 311 in FIG. 3, as illustrated at the bottom of FIG. 1(b), results in more energy being delivered into the inductor 301 over a shorter period of time in response to a load step. In turn, this causes the load voltage $V_{LOAD}$ to return to the target value at a time 125 which is sooner than the time 127 that the load voltage $V_{LOAD}$ returns to the target voltage in FIG. 1(a). Thus, the DC-to-DC converter illustrated in FIG. 3 corrects more quickly for a voltage error caused by a load step than the prior art circuit which generated the pulses illustrated at the bottom of FIG. 1(a).

A similar result may occur in connection with a load release, but for different reasons.

At some point during the operation of the DC-to-DC converter, there may be a load release, as reflected by a load release 129. For purposes of comparison, the load release 129 in FIG. 1(b) has been made to coincide with the load release 103 in FIG. 1(a). The timing and/or magnitude of the load release 129 may instead be different.

The load release 129 may occur after a fixed-width pulse has been initiated, as illustrated in FIG. 1(a). In FIG. 1(b), however, the pulse controller circuit 311 may operate differently. The load release 129 may cause a corresponding increase in the load voltage $V_{LOAD}$, as reflected by an increase at a time 131. The increase may cause the load voltage $V_{LOAD}$ to exceed the target load voltage by more than approximately one half of the peak-to-peak value of its ripple component plus the noise component margin. If this happens, the output of the pulse termination circuit 321 may rise, signaling the one shot circuit 315 to prematurely terminate the one shot pulse at the one shot output 327, as illustrated by the premature termination of this pulse in FIG. 1(b). This may prevent additional energy from being delivered into the inductor 301 at the wrong time, thus preventing the further increase in $V_{LOAD}$ which is illustrated in FIG. 1(a). In turn, this may reduce the time in which the converter illustrated in FIG. 3 can correct for the load voltage error caused by the load release.

This enhanced performance may be seen by comparing the time 135 at which the load voltage $V_{LOAD}$ returned to the target value in FIG. 1(b) with the corresponding time 137 at which the load voltage $V_{LOAD}$ returned to the target value in FIG. 1(a).

The enhanced ability of the PFM DC-to-DC converters illustrated in FIGS. 2 and 3 to respond to transient load currents can be demonstrated mathematically. The following is a presentation of one approach for doing so.

Several sources of transient errors may be identified and defined.

First, there may be a steady state ripple error voltage $V_{RIP}$ across the converter output capacitor which may be computed with the following equation:

$$V_{RIP} = \frac{I_{PPR}}{16 \cdot Freq \cdot C_{OUT}},$$

wherein $I_{PPR}$ is the peak-to-peak ripple current through the inductor.

Second, a voltage error $V_{TON}$ may be computed that occurs because of the fixed width pulse $T_{ON}$ that continues after a load release, based on the following equation:

$$V_{TON} = \frac{I_L \cdot T_{ON}}{C_{OUT}}.$$

Third, there may be a transient voltage error $V_{RMP}$ that is due to the inductor current ramp based on the following equation:

$$V_{RMP} = \frac{L \cdot (I_L + 0.5 \cdot I_{PPR})^2}{2 \cdot V_{IND} \cdot C_{OUT}} \cdot \frac{1}{P_D},$$

wherein $V_{IND}$ is the voltage across the inductor and $P_D$ is the pulse density.

The errors resulting from a load step and a load release in a prior art converter of the type discussed above may also be expressed mathematically.

For a typical load step, the output voltage error $V_{ERR}$ may be calculated based on the following equations:

$$V_{ERR} = V_{RIP} + V_{RMP}$$

$$V_{IND} = V_{IN} - V_{OUT}$$

$$P_D = \frac{T_{ON}}{T_{ON} + T_{OFF(min)}}$$

$$V_{ERR} = \frac{I_{PPR}}{16 \cdot Freq \cdot C_{OUT}} \cdot \frac{L \cdot (I_L + 0.5 \cdot I_{PPR})^2}{2 \cdot (V_{IN} - V_{OUT}) \cdot C_{OUT}} \cdot \frac{T_{ON} + T_{OFF(min)}}{T_{ON}},$$

wherein $V_{ERR}$ is the output voltage error, $V_{IND}$ is the voltage across the inductor, $T_{OFF(min)}$ represents the minimum off time between the pulses.

Similarly, the following equations may be used in connection with a typical load release in the prior art converter discussed above:

$$V_{ERR} = -V_{RIP} + V_{RMP} + V_{TON}$$

$$V_{IND} = V_{OUT}$$

$$P_D = 1$$

$$V_{ERR} = \frac{I_{PPR}}{16 \cdot Freq \cdot C_{OUT}} + \frac{L \cdot (I_L + 0.5 \cdot I_{PPR})^2}{2 \cdot V_{OUT} \cdot C_{OUT}} + \frac{I_L + T_{ON}}{C_{OUT}}$$

The converters illustrated in FIGS. 2 and 3, however, may no longer introduce any error because of a minimum $T_{OFF}$ time. As a result, $T_{OFF_{(min)}}$ is effectively reduced to zero, causing the equation which is recited above for the load step error to simplify to:

$$V_{ERR} = \frac{I_{PPR}}{16 \cdot Freq \cdot C_{OUT}} + \frac{L \cdot (I_L + 0.5 \cdot I_{PPR})^2}{2 \cdot (V_{IN} - V_{OUT}) \cdot C_{OUT}} 1$$

Similarly, during a load release, unwanted energy is no longer injected into the inductor, causing the typical load release equation that is discussed above in connection with the prior art converter to simplify to:

$$V_{ERR} = \frac{L \cdot (I_L + 0.5 \cdot I_{PPR})^2}{2 \cdot V_{OUT} \cdot C_{OUT}}$$

FIG. 4 is a table containing parameters of a prior art constant on time PFM DC-to-DC converter of the type that generates the signals illustrated in FIG. 1(*a*) and a PFM DC-to-DC converter of the type that generates the signals illustrated in FIG. 1(*b*). The voltage error ($V_{ERR}$) values in the lower portion of the table have been computed using the equations above based on the parameters that are listed in the upper portion of the table.

As illustrated in the table, the converter illustrated in FIGS. 2-3 may provide a 52% improvement in a load step error that takes place during a low duty factor as contrasted with the prior art converter whose signals are illustrated in FIG. 1(*a*). Similarly, the converter illustrated in FIGS. 2-3 may produce a 74% improvement during a load release that takes place during a high duty factor as compared to the prior art converter whose signals are illustrated in FIG. 1(*a*).

The components, steps, features, objects, benefits and advantages that have been discussed are merely illustrative. None of them, nor the discussions relating to them, are intended to limit the scope of protection in any way. Numerous other embodiments are also contemplated, including embodiments that have fewer, additional, and/or different components, steps, features, objects, benefits and advantages. The components and steps may also be arranged and ordered differently.

For example, the pulse controller circuit, such as the pulse controller circuit 215 in FIG. 2 and/or the pulse controller circuit 311 in FIG. 3, may be configured to enhance the response time of the traditional prior art converter only in connection with a load step or a load release, rather than in connection with both. If configured to only enhance the performance in connection with a load step, for example, the pulse termination circuits 237 and 321 may be omitted. Conversely, if only configured to improve the performance in connection with a load release, the OR gage 317 may be omitted.

The load step, pulse termination feature that has been described may be applied to other types of controllers or regulators. As with the systems described above, a pulse to the controller or regulator may be terminated when the output exceeds a target value, plus half of its ripple and a noise component margin.

The load step feature may be applied to a ripple regulator without an integrator while looking at current. For example, the negative terminal on the comparator 319 may be connected to the load voltage 333 and the positive terminal may be connected to the target voltage 345. This may create a non-integrating ripple regulator. When the load voltage 333 is less than the target voltage 345, a pulse may be initiated. This transient enhancement may keep the top switch high without a minimum off time if the output is less than the target voltage 345 when the pulse terminates.

The term "coupled" encompasses both direct and indirect coupling. For example, the term "coupled" encompasses the presence of intervening circuitry between two points that are coupled The phrase "means for" when used in a claim embraces the corresponding structures and materials that have been described and their equivalents. Similarly, the phrase "step for" when used in a claim embraces the corresponding acts that have been described and their equivalents. The absence of these phrases means that the claim is not limited to any of the corresponding structures, materials, or acts or to their equivalents.

Nothing that has been stated or illustrated is intended to cause a dedication of any component, step, feature, object, benefit, advantage, or equivalent to the public, regardless of whether it is recited in the claims.

In short, the scope of protection is limited solely by the claims that now follow. That scope is intended to be as broad as is reasonably consistent with the language that is used in the claims and to encompass all structural and functional equivalents.

What is claimed is:

1. A pulse controller circuit for use in a DC-to-DC converter comprising:
    a load voltage input configured to receive a signal that is representative of the voltage which the DC-to-DC converter applies to a load;
    an inductance current input configured to receive a signal that is representative of the current through an inductance through which current flows from a source voltage supply to the load through an electronic switching system;
    a pulse generator circuit configured to generate pulses that have a frequency that increases in response to increases in the load on the DC-to-DC converter, the pulse generator circuit further being configured to cause each pulse to have a constant width, except when the pulse reaches the end of the constant width and the magnitude of the current through the inductance is less than a threshold value, in which case the pulse generator is configured to extend the pulse until the magnitude of the current through the inductance reaches the threshold value; and
    a pulse output configured to deliver the pulses generated by the pulse generator circuit to the electronic switching system.

2. The pulse controller circuit of claim 1 further comprising a threshold generator circuit configured to generate a signal representative of the threshold value based on the load on the DC-to-DC converter.

3. The pulse controller circuit of claim 2 wherein the threshold generator circuit includes an integrator configured to integrate the difference between a signal that is representative of the voltage which the DC-to-DC converter applies to the load and a signal that is representative of a target voltage on the load.

4. The pulse controller circuit of claim 3 wherein the integration circuit includes a comparator and an RC network.

5. The pulse controller circuit of claim 1 wherein the pulse generator circuit includes a one-shot circuit.

6. The pulse controller circuit of claim 5 wherein the one-shot circuit is configured to be triggered each time the magnitude of the current through the inductance is less than the threshold value.

7. The pulse controller circuit of claim 6 wherein the one-shot circuit has an output and wherein the pulse generator circuit further comprises a logic circuit configured to generate the pulses based on a logical ORing of the output of the one-shot circuit and a comparison of the electronic signal representative of the current through the inductance and the electronic signal representative of the threshold value.

8. The pulse controller circuit of claim 1 wherein the voltage which the DC-to-DC converter applies to the load includes a ripple component having a peak-to-peak value and a noise component and wherein the pulse generator circuit is further configured to prematurely terminate each pulse if and at such time as the load voltage exceeds a target value by approximately half of the peak-to-peak voltage of the ripple component plus a noise component margin.

9. A pulse controller circuit for use in a DC-to-DC converter comprising:
 a load voltage input configured to receive a signal that is representative of the voltage which the DC-to-DC converter applies to a load, the voltage having a ripple component having a peak-to-peak value and a noise component;
 an inductance current input configured to receive a signal that is representative of the current through an inductance through which current flows from a source voltage supply to the load through an electronic switching system;
 a pulse generator circuit configured to generate pulses that have a frequency that increases in response to increases in the load on the DC-to-DC converter, the pulse generator circuit further being configured to cause each pulse to have a constant width, but to prematurely terminate each pulse if and at such time as the load voltage exceeds a target value by approximately half of the peak-to-peak voltage of the ripple component plus a noise component margin; and
 a pulse output configured to deliver the pulses generated by the pulse generator circuit to the electronic switching system.

10. The pulse controller circuit of claim 9 wherein the pulse generator circuit includes a pulse termination circuit configured to generate a pulse termination signal when the load voltage exceeds the target value by approximately half of the peak-to-peak voltage of the ripple component plus the noise component margin.

11. The pulse controller circuit of claim 10 wherein the pulse termination circuit includes a comparator and an offset circuit.

12. The pulse controller circuit of claim 11 wherein the offset circuit is configured to generate a signal that is representative of the target voltage plus approximately half of the peak-to-peak voltage of the ripple component plus the noise component margin and the comparator is configured to compare the signal representative of the load voltage with the signal generated by the offset circuit.

13. The pulse controller circuit of claim 10 wherein the pulse generator circuit includes a one-shot circuit that is configured to prematurely terminate a pulse that it generates upon receipt of a pulse termination signal.

14. The pulse controller circuit of claim 9 wherein the pulse generator circuit includes a one-shot circuit that is configured to be triggered each time the magnitude of the current through the inductance is less than a threshold value.

15. The pulse controller circuit of claim 14 further comprising a threshold generator circuit configured to generate the threshold value based on the load on the DC-to-DC converter.

16. The pulse controller circuit of claim 15 wherein the threshold generator circuit includes an integrator configured to integrate the difference between a signal that is representative of the voltage which the DC-to-DC converter applies to the load and a signal that is representative of a target voltage on the load.

17. The pulse controller circuit of claim 16 wherein the integration circuit includes a comparator and an RC network.

18. The pulse controller circuit of claim 14 wherein the pulse generator circuit is configured, when the pulse reaches the end of the constant width and the magnitude of the current through the inductance is less than the threshold value, to extend the pulse until the magnitude of the current through the inductance reaches the threshold value.

19. The pulse controller circuit of claim 14 wherein the one-shot circuit is configured to prematurely terminate each pulse as soon as the load voltage exceeds the target value by approximately half of the peak-to-peak voltage of the ripple component plus the noise component margin.

20. A DC-to-DC converter comprising:
 an electronic switching system;
 an inductance through which current flows from a source voltage supply to a load through the electronic switching system; and
 a pulse controller circuit for use in a DC-to-DC converter comprising:
  a load voltage input configured to receive a signal that is representative of the voltage which the DC-to-DC converter applies to a load;
  an inductance current input configured to receive a signal that is representative of the current through an inductance through which current flows from a source voltage supply to the load through an electronic switching system;
  a pulse generator circuit configured to generate pulses that have a frequency that increases in response to increases in the load on the DC-to-DC converter, the pulse generator circuit further being configured to cause each pulse to have a constant width, except when the pulse reaches the end of the constant width and the magnitude of the current through the inductance is less than a threshold value, in which case the pulse generator is configured to extend the pulse until the magnitude of the current through the inductance reaches the threshold value; and
  a pulse output configured to deliver the pulses generated by the pulse generator circuit to the electronic switching system.

21. A DC-to-DC converter comprising:
 an electronic switching system;
 an inductance through which current flows from a source voltage supply to a load through the electronic switching system; and a pulse controller circuit for use in a DC-to-DC converter comprising:

a load voltage input configured to receive a signal that is representative of the voltage which the DC-to-DC converter applies to a load, the voltage having a ripple component having a peak-to-peak value and a noise component;

an inductance current input configured to receive a signal that is representative of the current through an inductance through which current flows from a source voltage supply to the load through an electronic switching system;

a pulse generator circuit configured to generate pulses that have a frequency that increases in response to increases in the load on the DC-to-DC converter, the pulse generator circuit further being configured to cause each pulse to have a constant width, but to prematurely terminate each pulse if and at such time as the load voltage exceeds a target value by approximately half of the peak-to-peak voltage of the ripple component plus a noise component margin; and a pulse output configured to deliver the pulses generated by the pulse generator circuit to the electronic switching system.

22. A pulse controller circuit for use in a DC-to-DC converter comprising:

means for receiving a signal that is representative of the voltage which the DC-to-DC converter applies to a load;

means for receiving a signal that is representative of the current through an inductance through which current flows from a source voltage supply to the load through an electronic switching system;

means for generating pulses that have a frequency that increases in response to increases in the load on the DC-to-DC converter, the means for generating further functioning to cause each pulse to have a constant width, except when the pulse reaches the end of the constant width and the magnitude of the current through the inductance is less than a threshold value, in which case the means for generating pulses functions to extend the pulse until the magnitude of the current through the inductance reaches the threshold value; and means for delivering the pulses generated by the means for generating pulses to the electronic switching system.

23. A pulse controller circuit for use in a DC-to-DC converter comprising:

means for receiving a signal that is representative of the voltage which the DC-to-DC converter applies to a load, the voltage having a ripple component having a peak-to-peak value and a noise component;

means for receiving a signal that is representative of the current through an inductance through which current flows from a source voltage supply to the load through an electronic switching system;

means for generating pulses that have a frequency that increases in response to increases in the load on the DC-to-DC converter, the means for generating further functioning to cause each pulse to have a constant width, but to prematurely terminate each pulse if and at such time as the load voltage exceeds a target value by approximately half of the peak-to-peak voltage of the ripple component plus a noise component margin; and means for delivering the pulses generated by the means for generating pulses to the electronic switching system.

* * * * *